(12) United States Patent
Feng et al.

(10) Patent No.: US 10,433,169 B2
(45) Date of Patent: Oct. 1, 2019

(54) METHOD AND DEVICE FOR CONTROLLING INFORMATION TRANSMISSION, AND SMART TERMINAL

(71) Applicant: Beijing Xiaomi Mobile Software Co., Ltd., Beijing (CN)

(72) Inventors: Chao Feng, Beijing (CN); Bing Zhao, Beijing (CN); Xiaochuan Zheng, Beijing (CN)

(73) Assignee: Beijing Xiamoi Mobile Software Co., Ltd., Beijing (CN)

( * ) Notice: Subject to any disclaimer, the term of this patent is extended or adjusted under 35 U.S.C. 154(b) by 214 days.

(21) Appl. No.: 15/496,090

(22) Filed: Apr. 25, 2017

(65) Prior Publication Data

US 2017/0311160 A1    Oct. 26, 2017

(30) Foreign Application Priority Data

Apr. 26, 2016 (CN) .......................... 2016 1 0266841

(51) Int. Cl.
*H04L 29/06* (2006.01)
*H04W 12/06* (2009.01)
(Continued)

(52) U.S. Cl.
CPC ............ *H04W 12/06* (2013.01); *G06Q 20/20* (2013.01); *G06Q 20/3278* (2013.01);
(Continued)

(58) Field of Classification Search
None
See application file for complete search history.

(56) References Cited

U.S. PATENT DOCUMENTS 9,100,493 B1 * 8/2015 Zhou ................. H04M 1/72522
2008/0126260 A1   5/2008 Cox et al.
(Continued)

FOREIGN PATENT DOCUMENTS

CN      102819721 A     12/2012
CN      103186945 A     7/2013
(Continued)

OTHER PUBLICATIONS

Extended European Search Report for EP Application No. 17168231.3-1871, dated Jul. 12, 2017.
(Continued)

*Primary Examiner* — Malcolm Cribbs
(74) *Attorney, Agent, or Firm* — Finnegan, Henderson, Farabow, Garrett & Dunner LLP (57) ABSTRACT

The present disclosure relates to a method and a device for controlling information transmission and a smart terminal. The method includes: receiving an instruction for outputting information sent by a near field communication (NFC) chip, an information output function of the NFC chip being in a disabled state and information to be outputted being in an unavailable state; performing authentication of an identity of a user who triggers the information output; and if it is determined that the authentication of the identity is passed, enabling the information output function of the NFC chip and setting the information to be outputted as in an available state, such that the NFC chip can output the information. In the present disclosure, the information transmission through NFC can be more safe and reliable.

12 Claims, 6 Drawing Sheets

(51) Int. Cl.
*G06Q 20/32* (2012.01)
*G06Q 20/34* (2012.01)
*H04B 5/00* (2006.01)
*G06Q 20/40* (2012.01)
*G06Q 20/20* (2012.01)

(52) U.S. Cl.
CPC ..... *G06Q 20/341* (2013.01); *G06Q 20/40145* (2013.01); *H04B 5/0031* (2013.01); *H04L 63/0861* (2013.01)

(56) References Cited

U.S. PATENT DOCUMENTS

| | | | |
|---|---|---|---|
| 2008/0155257 A1* | 6/2008 | Werner | H04L 9/0844 713/168 |
| 2011/0173060 A1 | 7/2011 | Gallagher | |
| 2011/0313922 A1 | 12/2011 | Ben Ayed | |
| 2012/0089520 A1 | 4/2012 | Mardikar | |
| 2013/0076485 A1* | 3/2013 | Mullins | G06F 21/32 340/5.83 |
| 2013/0173925 A1* | 7/2013 | Yen | G06F 21/32 713/186 |
| 2014/0058935 A1 | 2/2014 | Mijares | |
| 2015/0044964 A1 | 2/2015 | Khan et al. | |
| 2015/0046324 A1* | 2/2015 | de la Cropte de Chanterac | G07F 7/0873 705/41 |
| 2015/0348001 A1* | 12/2015 | Van Os | G06Q 20/40 705/44 |
| 2016/0012272 A1* | 1/2016 | Wong | G06F 21/32 382/124 |
| 2016/0086168 A1 | 3/2016 | McKelvey | |
| 2016/0104154 A1* | 4/2016 | Milov | G06Q 20/4012 705/67 |
| 2016/0154952 A1* | 6/2016 | Venkatraman | H04L 63/0861 705/44 |
| 2016/0156603 A1* | 6/2016 | Janik | H04L 63/0492 726/7 |
| 2016/0224973 A1* | 8/2016 | Van Os | G06Q 20/32 |
| 2016/0247144 A1* | 8/2016 | Oh | G06Q 20/3278 |
| 2017/0024722 A1* | 1/2017 | Mhun | G06F 1/165 |

FOREIGN PATENT DOCUMENTS

| | | |
|---|---|---|
| CN | 103729948 A | 4/2014 |
| CN | 104038256 A | 9/2014 |
| CN | 104881779 A | 9/2015 |
| CN | 105354706 A | 2/2016 |
| EP | 2 515 472 A1 | 10/2012 |
| EP | 2945410 A1 | 11/2015 |
| EP | 3065098 A1 | 9/2016 |
| KR | 10-1999-0045684 A | 6/1999 |
| KR | 10-2013-0017507 A | 2/2013 |
| KR | 10-2015-0132471 A | 11/2015 |
| KR | 101570354 B1 | 11/2015 |
| RU | 2009101310 A | 7/2010 |
| RU | 2011115355 A | 10/2012 |
| WO | WO 2014/194592 A1 | 12/2014 |

OTHER PUBLICATIONS

English translation of International Search Report for International Application No. PCT/CN2016/094609, dated Feb. 7, 2017.
International Search Report issued by the State Intellectual Property Office of the People's Republic of China (SIPO) dated Feb. 7, 2017, in counterpart International Application No. PCT/CN2016/094609.

* cited by examiner

METHOD AND DEVICE FOR CONTROLLING INFORMATION TRANSMISSION, AND SMART TERMINAL

CROSS-REFERENCE TO RELATED APPLICATIONS

The present application is based upon and claims priority to Chinese Patent Application No. 201610266841.6 filed Apr. 26, 2016, the entire contents of which are incorporated herein by reference.

TECHNICAL FIELD

The present disclosure generally relates to the field of smart device technology and, more particularly, to a method and a device for controlling information transmission and a smart terminal including such device.

BACKGROUND

With the development of the technology of payment with a mobile terminal, presently, a smart terminal integrated with near field communication (NFC) payment function is becoming a trend. More and more terminal manufacturers support NFC payment, and how to ensure the security of NFC payment has become an important concern. In the related art, when conducting NFC payment, once a smart terminal detects a point-of-sale (POS) machine, the terminal can cause a bank card bound to the NFC function to be in an available state. After the user enters a password of the bank card, the POS machine can be used to read information of the bank card to complete the payment. This method has a security risk in that if the user loses his smart terminal and leaks his payment password, it may cause financial loss. This example of bank card payment shows that the NFC function may have a low security level in information transmission, such as in an NFC payment between a POS machine and a mobile terminal.

SUMMARY

According to a first aspect of the present disclosure, there is provided a method for controlling information output, comprising: receiving an instruction for outputting information sent by a near field communication (NFC) chip, an information output function of the NFC chip being in a disabled state and information to be outputted being in an unavailable state; performing authentication of an identity of a user who triggers the information output; and if it is determined that the authentication of the identity is passed, enabling the information output function of the NFC chip and setting the information to be outputted as in an available state, such that the NFC chip can output the information.

According to a second aspect of the present disclosure, there is provided a smart terminal, including: a processor; and a memory for storing instructions executable by the processor; wherein the processor is configured to perform: receiving an instruction for outputting information sent by a near field communication (NFC) chip, an information output function of the NFC chip being in a disabled state and information to be outputted being in an unavailable state; performing authentication of an identity of a user who triggers the information output; and if it is determined that the authentication of the identity is passed, enabling the information output function of the NFC chip and setting the information to be outputted as in an available state, such that the NFC chip can output the information.

According to a third aspect of the present disclosure, there is provided a non-transitory computer-readable storage medium having stored therein instructions that, when executed by a processor of a smart terminal, cause the smart terminal to perform a method for controlling information output, wherein the method comprises: receiving an instruction for outputting information sent by a near field communication (NFC) chip, an information output function of the NFC chip being in a disabled state and information to be outputted being in an unavailable state; performing authentication of an identity of a user who triggers the information output; and if it is determined that the authentication of the identity is passed, enabling the information output function of the NFC chip and setting the information to be outputted as in an available state, such that the NFC chip can output the information.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Presently, more and more smart terminals, such as mobile phones, support NFC technology as a means to transmit information. One important application is NFC payment. For example, Apple Pay is an NFC based payment application, in which information transmission is conducted based on NFC between a POS machine and a smart mobile phone of a user, to enable reading information of a bank card which is bound to the mobile phone.

Figure 1:
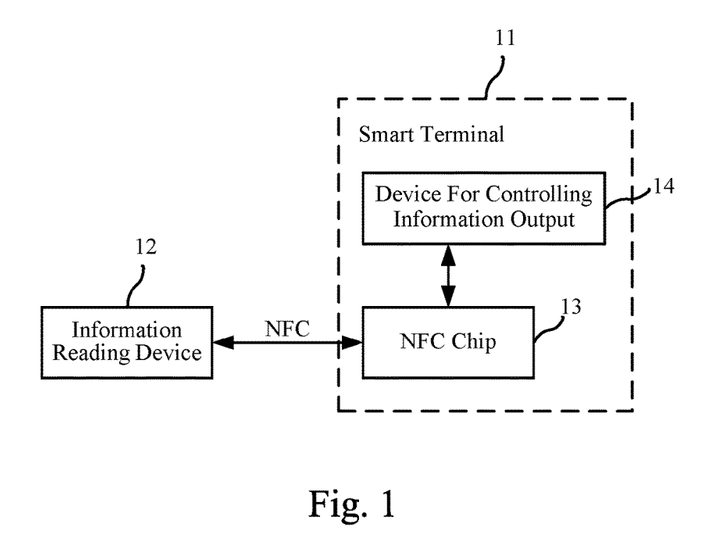
FIG. 1 is a schematic diagram illustrating an application scenario of NFC information transmission according to an exemplary embodiment.

Embodiments of the present disclosure provide a method for controlling information output, which improves the security level in information transmission by means of NFC. FIG. 1 illustrates an application scenario of NFC information transmission, for example, NFC payment. A smart terminal 11 stores therein information to be transmitted. For example, in a payment scenario, relevant information of a bank card for payment may be the information to be transmitted. An information reading device 12 is a device configured to read information in the smart terminal 11, such as a POS machine.

The smart terminal 11 can include an NFC chip 13 and a device 14 for controlling information output. In an example, the NFC chip 13 can conduct NFC communication with the information reading device 12. The device 14 for controlling information output can control the NFC chip 13 to output information to the information reading device 12. In the example, before the information transmission, the information output function of the NFC chip 13 can be set as disabled, that is, causing the NFC chip 13 unable to transmit information by means of NFC technology to the information reading device 12, and information to be transmitted can be set as in an unavailable state. The information can be stored in the NFC chip 13. The unavailable state refers to a state in which even if the information output function of the NFC chip 13 is enabled, the information cannot be transmitted.

Figure 2:
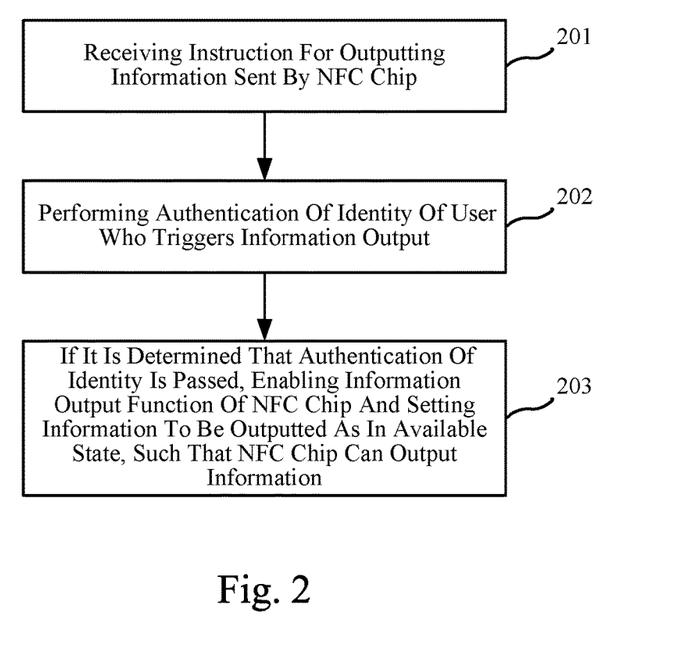
FIG. 2 is a flowchart illustrating a method for controlling information output according to an exemplary embodiment.

In the embodiment of the present disclosure, the device 14 for controlling information output can perform the method as shown in FIG. 2, to control the condition in which the NFC chip 13 can transmit information to the information reading device 12, so as to ensure the security of the information transmission as far as possible. As shown in FIG. 2, the method can include the following steps.

At step 201, an instruction for outputting information sent by the NFC chip 13 is received.

For example, the device 14 for controlling information output can receive an instruction for outputting information. When the user puts the smart terminal 11 close to the information reading device 12, the NFC chip 13 can sense the information reading device 12 and notify the device 14 for controlling information output that there is currently a device which requests for reading information.

At step 202, authentication of an identity of a user who triggers the information output is performed.

For example, after the device 14 for controlling information output receives the instruction at step 201, the device 14 for controlling information output can perform authentication of the identity of the user. In a payment scenario, for example, a person who is not the owner of the mobile phone and steals the mobile phone uses the mobile phone to perform NFC payment. The device 14 for controlling information output can perform authentication of the identity of the person who steals the mobile phone to ensure security in NFC payment in this case, so as to protect the user's financial safety.

At this step, the authentication of the identity can be performed based on identity information such as a fingerprint or other physiological information. However, the identity information can also be other information which can uniquely present the identity of the user. The information can be previously input to the smart terminal in a safe way to be stored therein, so as to be used in the authentication at this step.

At step 203, if it is determined that the authentication of the identity is passed, the information output function of the NFC chip is enabled, and the information to be outputted is set as in an available state, such that the NFC chip can output the information.

For example, if at step 202 the authentication of the identity is passed, the device 14 for controlling information output can enable the NFC chip 13 to transmit information, and set the information to be transmitted as in an available state. Then, the NFC chip 13 can transmit information to the information reading device 12 through NFC.

It can be seen from the method for controlling information output in the present embodiment that, even if the smart terminal 11 and the information reading device 12 can sense the existence of each other, the smart terminal and the information reading device 12 cannot readily perform information transmission through NFC. Only after the authentication of the identity of the user is passed, the information can be transmitted. Moreover, the information output function of the NFC chip 13 and the availability of the information can be controlled, and the corresponding function can be enabled after the authentication is passed. In this way, the information transmission through NFC can be more safe and reliable.

Now the application of the method for controlling information output of the present disclosure in the scenario of NFC payment, for example, will be described.

Figure 3:
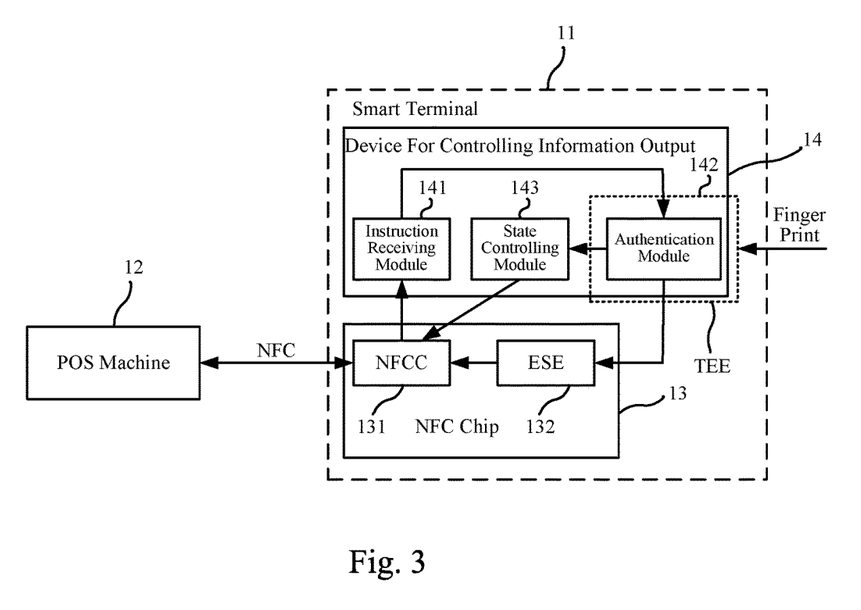
FIG. 3 is a schematic diagram illustrating NFC information transmission in a payment scenario according to an exemplary embodiment.

In one exemplary embodiment, as shown in FIG. 3, the information reading device 12 may be a POS machine, and the NFC chip 13 in the smart terminal 11 can include an NFC Controller (NFCC) 131 and an Embedded Secure Element (ESE) 132, which may be a secure chip embedded in the NFC chip 13. In the embodiment, for NFC payment, the payment information, which may be information about a bank card used for the payment, can be stored in the ESE 132. The ESE 132 is connected to the NFCC 131, and the NFCC 131 can communicate with the POS machine 12 by means of NFC.

The NFCC 131 can generally have three modes: a card emulation mode, a point-to-point (P2P) mode, and a reader/writer mode. In the payment application scenario herein, the card emulation mode is employed. The above three modes will be described below.

In the card emulation mode, the smart terminal 11 in which the NFC chip 13 is disposed can be considered as a card emulation device for storing information to be read out. This mode can emulate an IC card of Radio Frequency Identification (RFID) technology, so as to replace various IC cards (including a credit card), such as a swiped card in a shopping mall, a bus card, an entrance card, a train ticket, an admission ticket, and so on.

The P2P mode can be used for data exchange, like data exchange by means of infrared. The transmission distance is shorter, the transmission establishment speed and the transmission speed are faster, and the power consumption is lower. In this mode, two devices having NFC function can be connected wirelessly, to transmit data from a device to another device, such as downloading a song, exchanging a picture, or updating a device address list. Therefore, through NFC, devices such as a digital camera, a computer, and a mobile phone can exchange data or share service.

In the reader/writer mode, the device can be used as a non-contact card reader, for example, for reading information from a poster or an exhibition electronic tag. This mode can also implement data exchange between NFC mobile phones. It brings significant convenience for document sharing in an enterprise environment or for multi-player games.

In the illustrated embodiment, as long as the NFCC 131 supports the card emulation mode and the bank card stored in the ESE 132 is in an activated state (i.e. an available state), the NFCC 131 can communicate by means of NFC and transmit the information about the bank card stored in the ESE 132 to the POS machine 12 to implement the NFC payment.

As shown in FIG. 3, the device 14 for controlling information output in the embodiment of the present disclosure can include an instruction receiving module 141, an authentication module 142, and a state controlling module 143. It should be noted that, the three functional modules are merely divided in logic for the purpose of illustration. The practical implementation is not limited thereto. For example, the functions can be divided into two modules, or some of the modules are in the same application. For example, the instruction receiving module 141 and the state controlling module 143 belong to one application, and the authentication module 142 belongs to another application. Alternatively, the three modules are in the same application, and so on. In another embodiment, the authentication module 142 can be disposed in a trusted execution environment (TEE) to further improve the security level of the authentication. The TEE is also in the smart terminal 11 in which the NFC chip 13 is disposed.

Figure 4:
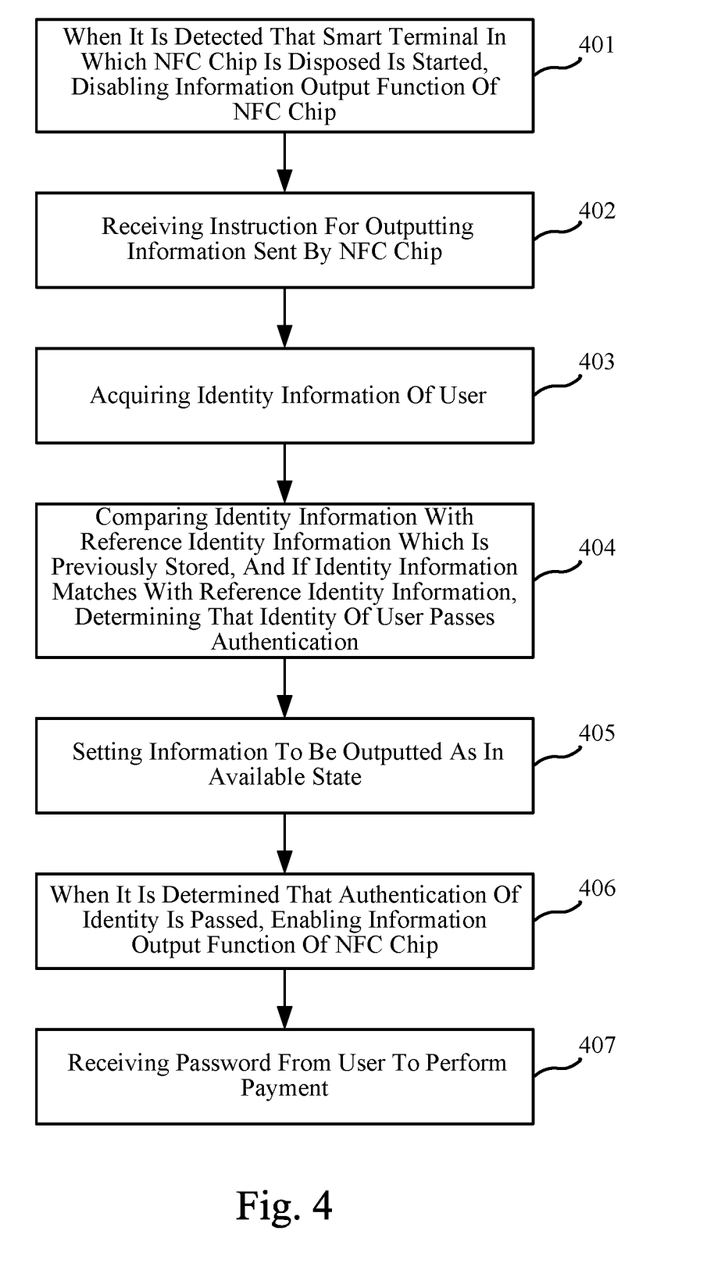
FIG. 4 is a flowchart illustrating another method for controlling information output according to an exemplary embodiment.

Referring to the scenario as shown in FIG. 3 together with the flowchart as shown in FIG. 4, the method for controlling the information transmission performed in a scenario of NFC payment will be described.

At step 401, when it is detected that a smart terminal 11 with an NFC chip 13 is started, an information output function of the NFC chip 13 is disabled.

For example, the smart terminal 11 is a mobile phone. When the smart phone 11 of the user is started, the state controlling module 143 in the device 14 for controlling information output can set the information output function of the NFCC 131 as in a disabled state. In this example, the card emulation mode of the NFCC 131 is disabled. For example, the NFCC 131 can support the P2P mode and the reader/writer mode in this case. In addition, the information stored in the NFC chip 13, which will be outputted, can be set as in an unavailable state. The information can be stored in the ESE 132.

By controlling the information output function of the NFC chip 13 to be disabled and the stored information to be unavailable when the mobile phone 11 is started, it can effectively prevent the information from being outputted in an insecure manner. Only after a condition for allowing the information to be outputted is met, the information in the NFC chip 13 is allowed to be outputted. In this way, it can ensure the security of the information output.

At step 402, an instruction for outputting information sent by the NFC chip 13 is received.

For example, when the user puts the mobile phone 11 close to the POS machine 12, the NFCC 131 in the mobile phone 11 can sense the existence of the POS machine 12 and send an instruction for outputting information to the instruction receiving module 141 in the device 14 for controlling information output, to notify that the POS machine 12 requires information in the NFC chip 13, such as the information about the bank card stored in the ESE 132 for the NFC payment scenario.

At step 403, an identity of the user is acquired.

For example, the instruction receiving module 141 can invoke the authentication module 142 in the TEE environment and instruct the authentication module 142 to perform authentication of the identity of the user who triggers the information output. For example, the information about the identity is fingerprint information. In this case, the authentication module 142 can prompt the user to input his or her fingerprint, and then perform authentication of the fingerprint. If the authentication of the fingerprint is performed in the TEE environment, it can further improve the security level of the authentication. In addition, the authentication module 142 can also instruct another module to perform the authentication of the fingerprint and acquire the result of the authentication from said module. The present disclosure is not limited thereto.

At step 404, the information about the identity is compared with reference identity information which is previously stored. If the information about the identity matches the reference identity information, it can be determined that the authentication of identity of the user is passed.

At this step, the fingerprint of the user which is read out can be compared with reference identity information which is previously stored. The reference identity information is user fingerprint information that is proved to be true. For example, the reference identity information can be previously inputted to the mobile phone 11 by the owner of the mobile phone 11 in a safe way.

If the result is that the authentication is not passed at this step, that is, the fingerprint of the user is different from the reference fingerprint, a warning can be outputted to the user and the user is denied usage of the NFC payment function. If the result is that the authentication is passed at this step, step 405 will be performed.

At step 405, the information to be outputted is set as in an available state.

For example, after it is determined that the user fingerprint passes the authentication, the authentication module 142 can activate the bank card in the ESE 132 to set the bank card as in an available state. In addition, the authentication module 142 can also notify the result of the authentication of the fingerprint to the state controlling module 143.

At step 406, when it is determined that the authentication of the identity is passed, the information output function of the NFC chip 13 is enabled.

For example, when it is determined that the authentication of the identity of the user is passed, the state controlling module 143 can set the NFCC 131 as supporting the card emulation mode. At this time, since the NFCC 131 can support the card emulation mode, and the bank card in the ESE 132 is activated, the NFC chip 13 can have the function to output information to the POS machine.

At step 407, a password is received from the user to perform payment.

For example, the user can input a password corresponding to the bank card. Information can be transmitted between the POS machine and the NFC chip to perform the NFC payment.

It can be seen from the method for controlling information output in the present embodiment that, even if the smart terminal 11 and the information reading device 12 can sense the existence of each other, the smart terminal 11 and the information reading device 12 cannot readily perform information transmission through NFC. Only after the authentication of the identity of the user is passed, the information can be transmitted. Moreover, the information output function of the NFC chip and the availability of the information can be controlled, and the corresponding function can be enabled after the authentication is passed. In this way, the information transmission through NFC can be more safe and reliable. In addition, if the authentication is performed in the TEE, it will further improve the security level.

Figure 5:
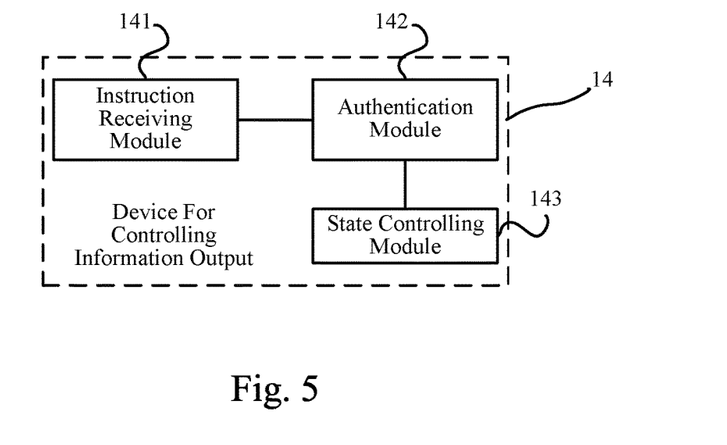
FIG. 5 is a block diagram illustrating a device for controlling information output according to an exemplary embodiment.

Embodiments of the present disclosure also provide a device for controlling information output. FIG. 5 illustrates a schematic diagram of the device 14 for controlling information output in a smart terminal 11. In the present embodiment, the structure of the device will be described briefly, and the detailed description of the operation principle can refer to the description of the corresponding method embodiments. As shown in FIG. 5, the device 14 for controlling information output can include: an instruction receiving module 141, an authentication module 142, and a state controlling module 143.

The instruction receiving module 141 is configured to receive an instruction for outputting information sent by the NFC chip 13, an information output function of the NFC chip being in a disabled state and information to be outputted being in an unavailable state.

The authentication module 142 is configured to perform authentication of an identity of a user who triggers the information output.

The state controlling module 143 is configured to, if it is determined that the authentication of the identity is passed, enable the information output function of the NFC chip 13 and set the information to be outputted as in an available state, such that the NFC chip 13 can output the information.

In an embodiment, the state controlling module 143 is further configured to, before the instruction for outputting information sent by the NFC chip 13 is received, when it is detected that a smart terminal 11 in which the NFC chip 13 is disposed is started, disable the information output function of the NFC chip 13.

In an embodiment, the information to be outputted is information about payment, the information output function of the NFC chip 13 is a card emulation function of NFC, and the card emulation function can cause the smart terminal 11 in which the NFC chip 13 is disposed to become a card emulation device for storing information to be read out.

In an embodiment, the authentication module 142 is configured to, when performing authentication of the identity of the user who triggers the information output, acquire identity information of the user; and compare the identity information with reference identity information which is previously stored. If the identity information matches the reference identity information, the authentication module 142 is configured to determine that the identity of the user passes the authentication. For example, the identity information can be fingerprint information.

In an embodiment, in order to further improve the security level in identity authentication, the authentication module is disposed in a trusted execution environment (TEE), and the TEE is disposed in the smart terminal in which the NFC chip is disposed.

Figure 6:
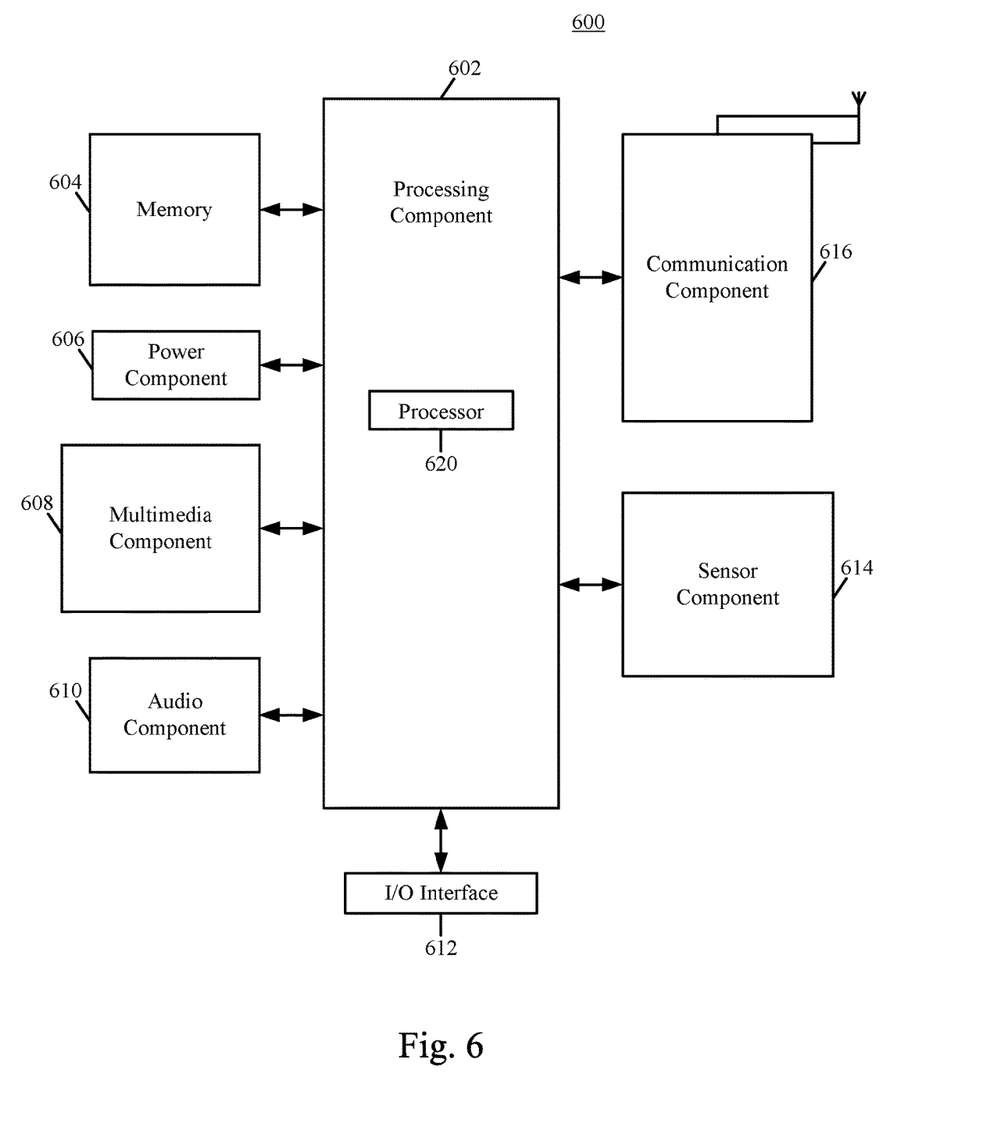
FIG. 6 is a block diagram illustrating a smart terminal according to an exemplary embodiment.

FIG. 6 is a block diagram illustrating a smart terminal 600 according to an exemplary embodiment. For example, the smart terminal 600 can be a mobile phone, a computer, a digital broadcast terminal, a messaging device, a gaming console, a tablet, a medical device, exercise equipment, a personal digital assistant, and the like.

Referring to FIG. 6, the smart terminal 600 can include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the smart terminal 600, such as the operations associated with display, telephone calls, data communications, camera operations, and recording operations. The processing component 602 can include one or more processors 620 to execute instructions to perform all or part of the steps in the above described methods. For example, a processor 620 may be included in the device 14 for controlling information output (FIG. 3). Moreover, the processing component 602 can include one or more modules which facilitate the interaction between the processing component 602 and other components. For instance, the processing component 602 can include a multimedia module to facilitate the interaction between the multimedia component 608 and the processing component 602.

The memory 604 is configured to store various types of data to support the operation of the smart terminal 600. Examples of such data include instructions for any applications or methods operated on the smart terminal 600, contact data, phonebook data, messages, pictures, video, etc. The memory 604 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

In the present embodiment, the memory 604 stores instructions executable by the processor, and the processor is configured to, by executing the instructions, perform: receiving an instruction for outputting information sent by an NFC chip, an information output function of the NFC chip being in a disabled state and information to be outputted being in an unavailable state; performing authentication of an identity of a user who triggers the information output; and if it is determined that the authentication of the identity is passed, enabling the information output function of the NFC chip and setting the information to be outputted as in an available state, such that the NFC chip can output the information.

The power component 606 provides power to various components of the smart terminal 600. The power component 606 can include a power management system, one or more power sources, and any other components associated with the generation, management, and distribution of power in the smart terminal 600.

The multimedia component 608 includes a screen providing an output interface between the smart terminal 600 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 608 includes a front camera and/or a rear camera. The front camera and the rear camera can receive an external multimedia datum while the smart terminal 600 is in an operation mode, such as a photographing mode or a video mode. Each of the front camera and the rear camera can be a fixed optical lens system or have focus and optical zoom capability.

The audio component 610 is configured to output and/or input audio signals. For example, the audio component 610 includes a microphone ("MIC") configured to receive an external audio signal when the smart terminal 600 is in an operation mode, such as a call mode, a recording mode, and a voice recognition mode. The received audio signal can be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons can include, but are not limited to, a home button, a volume button, a starting button, and a locking button.

The sensor component 614 includes one or more sensors to provide status assessments of various aspects of the smart terminal 600. For instance, the sensor component 614 can detect an open/closed status of the smart terminal 600, relative positioning of components, e.g., the display and the keypad, of the smart terminal 600, a change in position of the smart terminal 600 or a component of the smart terminal 600, a presence or absence of user contact with the smart terminal 600, an orientation or an acceleration/deceleration of the smart terminal 600, and a change in temperature of the smart terminal 600. The sensor component 614 can include a proximity sensor configured to detect the presence of nearby objects without any physical contact. The sensor component 614 can also include a light sensor, such as a CMOS or CCD image sensor, for use in imaging applications. In some embodiments, the sensor component 614 can also include an accelerometer sensor, a gyroscope sensor, a magnetic sensor, a pressure sensor, or a temperature sensor.

The communication component 616 is configured to facilitate communication, wired or wirelessly, between the smart terminal 600 and other devices. The smart terminal 600 can access a wireless network based on a communication standard, such as WiFi, 2G; or 4G or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the smart terminal 600 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In addition, in an exemplary embodiment of the present disclosure, there is also provided a non-transitory computer-readable storage medium including instructions, such as included in the memory 604, executable by the processor 620 in the smart terminal 600, for performing the above-described methods. For example, the method includes: receiving an instruction for outputting information sent by an NFC chip, an information output function of the NFC chip being in a disabled state and information to be outputted being in an unavailable state; performing authentication of an identity of a user who triggers the information output; and if it is determined that the authentication of the identity is passed, enabling the information output function of the NFC chip and setting the information to be outputted as in an available state, such that the NFC chip can output the information. For example, the non-transitory computer-readable storage medium can be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling information output, comprising:
    when it is detected that a smart terminal in which a near field communication (NFC) chip is disposed is started, disabling an information output function of the NFC chip;
    after disabling the information output function of the NFC chip, receiving an instruction for outputting information sent by the NFC chip, information to be outputted being in an unavailable state;
    performing authentication of an identity of a user who triggers the information output; and
    when it is determined that the authentication of the identity is passed, enabling the information output function of the NFC chip and setting the information to be outputted as in an available state, such that the NFC chip can output the information,
    wherein the information to be outputted is information about payment, the information output function of the NFC chip is a card emulation function of NFC, and the card emulation function causes a smart terminal in which the NFC chip is disposed to become a card emulation device for storing information to be read out.

2. The method of claim 1, wherein performing authentication of an identity of a user who triggers the information output comprises:
    acquiring identity information of the user; and
    comparing the acquired identity information with reference identity information which is previously stored, and if the acquired identity information matches the reference identity information, determining that the authentication of the identity of the user is passed.

3. The method of claim 2, wherein the identity information is a fingerprint.

4. The method of claim 1, wherein the authentication is performed in a trusted execution environment (TEE), and the TEE is disposed in a smart terminal in which the NFC chip is disposed.

5. A smart terminal, comprises: a processor; and a memory for storing instructions executable by the processor; wherein the processor is configured to perform:

when it is detected that a smart terminal in which a near field communication (NFC) chip is disposed is started, disabling an information output function of the NFC chip;

after disabling the information output function of the NFC chip, receiving an instruction for outputting information sent by the NFC chip information to be outputted being in an unavailable state;

performing authentication of an identity of a user who triggers the information output; and if it is determined that the authentication of the identity is passed, enabling the information output function of the NFC chip and setting the information to be outputted as in an available state, such that the NFC chip can output the information, wherein the information to be outputted is information about payment, the information output function of the NFC chip is a card emulation function of NFC, and the card emulation function causes the smart terminal in which the NFC chip is disposed to become a card emulation device for storing information to be read out.

6. The smart terminal of claim 5, wherein the processor is further configured to perform:

acquiring identity information of the user; and comparing the acquired identity information with reference identity information which is previously stored, and if the acquired identity information matches the reference identity information, determining that the authentication of the identity of the user is passed.

7. The smart terminal of claim 6, wherein the identity information is a fingerprint.

8. The smart terminal of claim 5, wherein the authentication is performed in a trusted execution environment (TEE), and the TEE is disposed in the smart terminal in which the NFC chip is disposed.

9. A non-transitory computer-readable storage medium having stored therein instructions that, when executed by a processor of a smart terminal, cause the smart terminal to perform a method for controlling information output, wherein the method comprises:

when it is detected that a smart terminal in which a near field communication (NFC) chip is disposed is started, disabling an information output function of the NFC chip;

after disabling the information output function of the NFC chip, receiving an instruction for outputting information sent by the NFC chip, information to be outputted being in an unavailable state;

performing authentication of an identity of a user who triggers the information output; and if it is determined that the authentication of the identity is passed, enabling the information output function of the NFC chip and setting the information to be outputted as in an available state, such that the NFC chip can output the information, wherein the information to be outputted is information shout payment, the information output function of the NFC chip is a card emulation function of NFC, and the card emulation function causes the smart terminal in which the NFC chip is disposed to become a card emulation device for storing information to be read out.

10. The non-transitory computer-readable storage medium of claim 9, wherein performing authentication of an identity of a user who triggers the information output comprises:

acquiring identity information of the user; and comparing the acquired identity information with reference identity information which is previously stored, and if the acquired identity information matches the reference identity information, determining that the authentication of the identity of the user is passed.

11. The non-transitory computer-readable storage medium of claim 10, wherein the identity information is a fingerprint.

12. The non-transitory computer-readable storage medium of claim 9, wherein the authentication is performed in a trusted execution environment (TEE), and the TEE is disposed in the smart terminal in which the NFC chip is disposed.

* * * * *